(12) United States Patent
Cooper

(10) Patent No.: US 6,888,496 B1
(45) Date of Patent: May 3, 2005

(54) LIFE RAFT

(76) Inventor: David Scott Cooper, 11159 Lyndora St., Norwalk, CA (US) 90650

( * ) Notice: Subject to any disclaimer, the term of this patent is extended or adjusted under 35 U.S.C. 154(b) by 0 days.

(21) Appl. No.: 10/890,677

(22) Filed: Jul. 13, 2004

Related U.S. Application Data
(60) Provisional application No. 60/487,109, filed on Jul. 15, 2003.

(51) Int. Cl.[7] .............................. H04B 7/185; G01S 5/02
(52) U.S. Cl. .............................. 342/357.07; 342/357.06
(58) Field of Search ...................... 342/357.06, 357.07, 342/357.13; 701/207, 213; 441/80, 84, 89

(56) References Cited

U.S. PATENT DOCUMENTS

| 5,597,335 | A | | 1/1997 | Woodland |
| 6,125,782 | A | | 10/2000 | Takashima |
| 6,195,039 | B1 | | 2/2001 | Glass, Jr. |
| 6,314,579 | B1 | * | 11/2001 | Marcon .......................... 2/102 |
| 6,570,532 | B2 | * | 5/2003 | Mise et al. ............... 342/357.1 |
| 2002/0119715 | A1 | * | 8/2002 | Pons ............................ 441/80 |

* cited by examiner

*Primary Examiner*—Dao Phan
(74) *Attorney, Agent, or Firm*—Matthew J. Peirce

(57) ABSTRACT

A personal survival kit for use in various emergency or survival situations is disclosed. The survival kit has a plurality of features to permit rescue or to aid in survival while waiting to be rescued. The survival kit has features to allow it to be temporarily attached to an individual.

8 Claims, 3 Drawing Sheets

LIFE RAFT

I. CROSS REFERENCE TO RELATED APPLICATIONS

This application claims benefit of U.S. Provisional Application No. 60/487,109, filed Jul. 15, 2003.

II. BACKGROUND OF THE INVENTION

The present invention concerns that of a new improved personal survival kit for use in various emergency or survival situations.

III. DESCRIPTION OF THE PRIOR ART

U.S. Pat. No. 6,195,039, issued to Glass, Jr., discloses a rescue locating device comprised of a portable tubular container with a Mylar signal balloon, rf, strobe light and transmitter and GPS unit.

U.S. Pat. No. 6,125,782, issued to Takashima, discloses a combination small craft with a GPS system incorporated therein.

U.S. Pat. No. 5,597,335, issued to Woodland, discloses an air, sea, or land rescue device.

IV. SUMMARY OF THE INVENTION

The present invention concerns that of a new and improved personal survival kit for use in various emergency or survival situations. The survival kit would have a plurality of features to permit rescue or to aid in survival while waiting to be rescued. The survival kit would have features to allow it to be temporarily attached to an individual.

There has thus been outlined, rather broadly, the more important features of a personal survival kit that the detailed description thereof that follows may be better understood and in order that the present contribution to the art may be better appreciated. There are, of course, additional features of the personal survival kit that will be described hereinafter and which will form the subject matter of the claims appended hereto.

In this respect, before explaining at least one embodiment of the personal survival kit in detail, it is to be understood that the personal survival kit is not limited in its application to the details of construction and to the arrangements of the components set forth in the following description or illustrated in the drawings. The personal survival kit is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present personal survival kit. It is important, therefore, that the claims be regarded as including such equivalent constructions insofar as they do not depart from the spirit and scope of the present invention.

It is therefore an object of the present invention to provide a personal survival kit which has all of the advantages of the prior art and none of the disadvantages.

It is another object of the present invention to provide a personal survival kit which may be easily and efficiently manufactured and marketed.

It is another object of the present invention to provide a personal survival kit which is of durable and reliable construction.

It is yet another object of the present invention to provide a personal survival kit which is economically affordable and available for relevant market segment of the purchasing public.

Other objects, features and advantages of the present invention will become more readily apparent from the following detailed description of the preferred embodiment when considered with the attached drawings and appended claims.

V. BRIEF DESCRIPTION OF THE DRAWINGS

VI. DESCRIPTION OF THE PREFERRED EMBODIMENT

Figure 1:
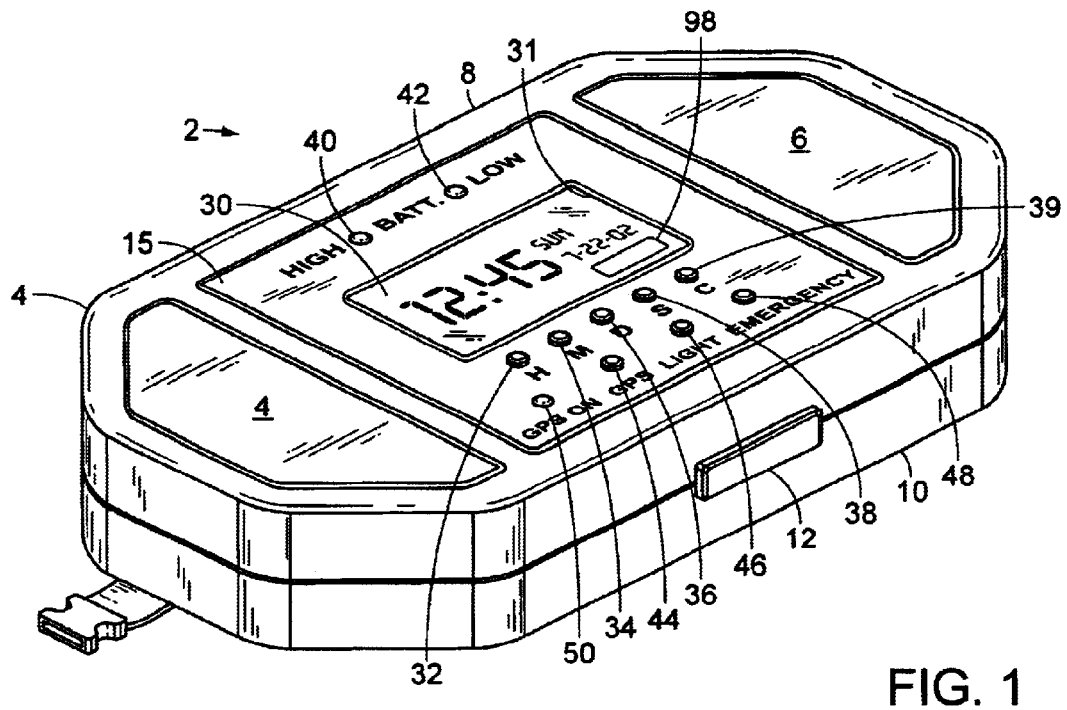
FIG. 1 shows a front perspective view of the survival kit.
Figure 2:
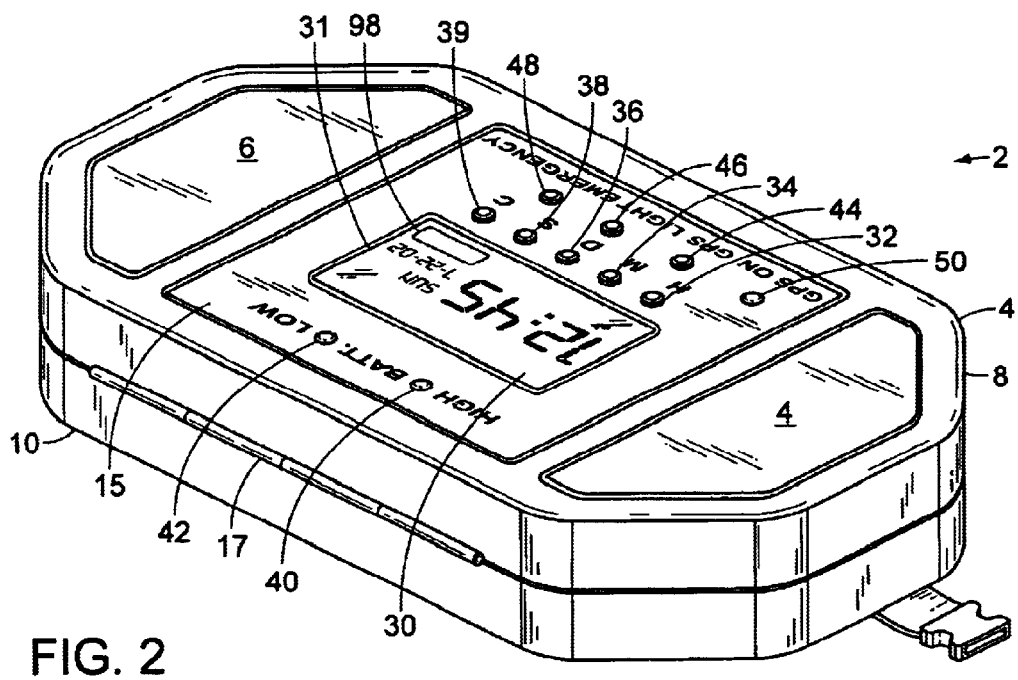
FIG. 2 shows a rear perspective view of the survival kit.

FIG. 1 shows a front perspective view of the survival kit 2, while FIG. 2 shows a rear perspective view of the survival kit. Survival kit 2 would essentially be a survivalist type of merchandise which could be used, if desired or necessary, for a wide variety of survival and/or emergency functions.

Survival kit 2 has an outer casing 4, has a hexagonal shape, and is comprised of two halves, a top half 8 and a bottom half 10. Top half 8 and bottom half 10 would be pivotally attached to one another by hinge 17, which can be seen in FIG. 2. Top half 8 and bottom half 10 each have two surfaces, an inner surface and an outer surface. When top half 8 and bottom half 10 are pressed against one another, latch 12 would keep this tight seal between the two halves.

Top half 8 has an outer surface which has a centrally mounted control panel 15. Control panel 15 includes an indiglo clock 30 which would, at the very least, be capable of notifying an individual of the current time, date, and day of the week.

Immediately below the clock 30 would be a plurality of buttons lined up in a row. This plurality of buttons would comprise button 32, button 34, button 36, button 38, and button 39. Button 32 would have an "H" indicator by it and would be used to set the hour of the day on the clock 30. Button 34 would have an "M" indicator by it and would be used to set the minutes of the day on the clock 30. Button 36 would have an "D" indicator by it and would be used to set the day and date of the day on the clock 30.

Button 38 would have a "S" indicator by it. Pressing button 38, by itself, clears prior settings chosen by buttons 32, 34, and 36, so that a user could reset these settings on clock 30. If a user wanted to set the hour, minute, day, and/or date, they must press button 38 simultaneously with the other desired buttons to change the desired attributes.

Button 39 would have a "C" indicator by it, with "C" standing for "compass." When pressed, it shows a compass-like figure in clock 30 and indicates true north to allow an individual to figure out various directions. A true compass 98 is located within the clock 30 and allows the compass functions to be displayed on the clock face once the button 39 is depressed.

Immediately below this first row of buttons would be a second row of buttons, which would comprise GPS button 44, light button 46, and emergency light button 48. By activating GPS button 44, the survival kit 2 would send out a GPS signal via the radio wave transmitter 47, which would then emit radio waves capable of being picked up by GPS satellites, allowing rescuers to locate you anywhere in the world. Light button 46, when depressed, activates the light 31 within the clock 30 for a predetermined amount of time to allow the clock 30 to be read at night.

On either side of the control panel 15 would be a pair of lights 4 and 6. When emergency light button 48 would be depressed, lights 4 and 6 would intermittently flash. The surface area of the lights 4 and 6 would be fairly large and would cover most of the outer surface of the top half 8 of the survival kit 2.

Immediately to the left of the GPS button 44 would be the GPS indicator light 50. The GPS indicator light 50 would normally be off, but would actually turn on once the GPS function had been activated by depressing the GPS button 44. The GPS indicator light 50 would stay on as long as the GPS function of the survival kit 2 remains in an "on" position.

Immediately above the location of the clock 30 would be battery indicator lights 40 and 42. Light 40 would have the word "high" written next to it, while light 42 would have the word "low" written next to it. Light 40 would light up when the battery power would be high, while light 42 would light up when the battery power of the present invention would be low.

Figure 3:
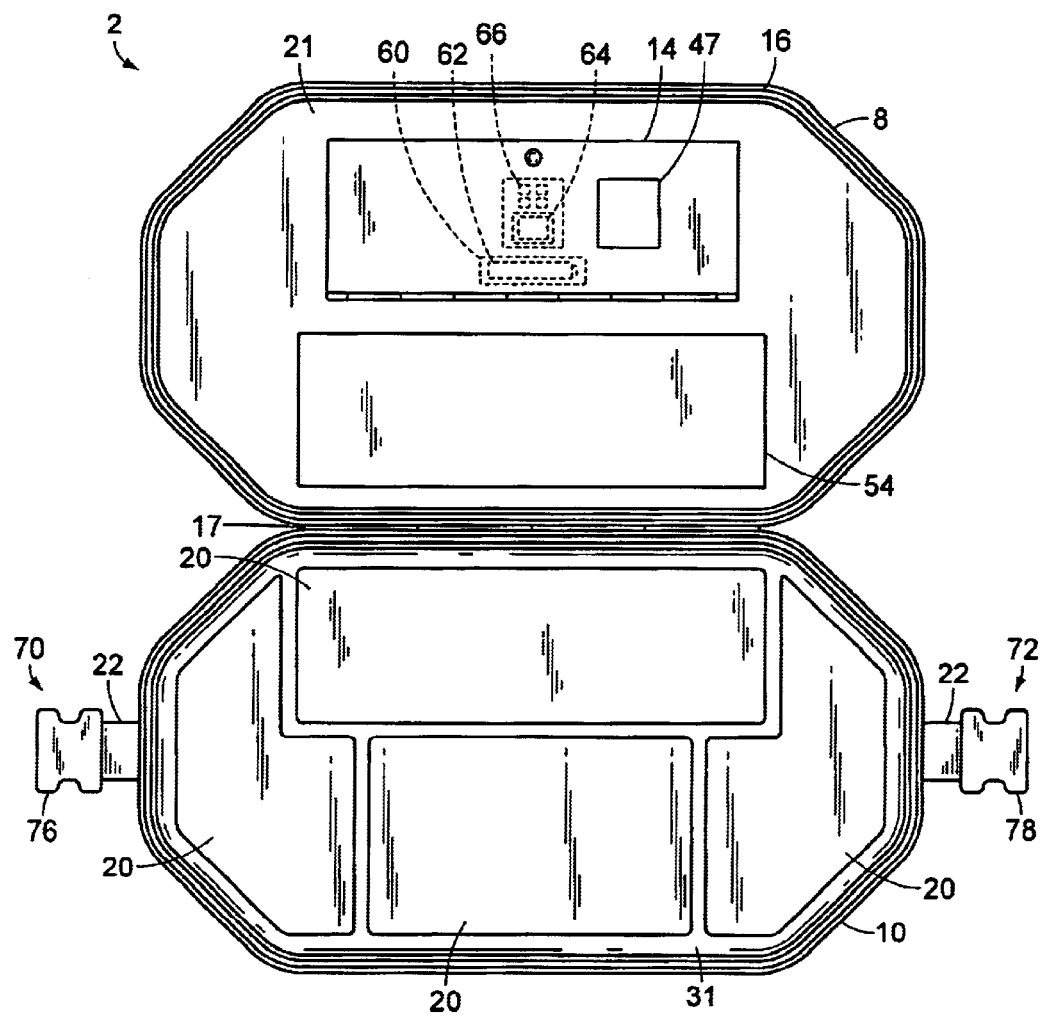
FIG. 3 shows a top view of the survival kit.

FIG. 3 shows a top view of the survival kit. The inner surface 21 of the top half 8 of the survival kit 2 would include a pair of storage compartments 14 and 54. Compartment 14 would be sealed with a waterproof door and would include a battery compartment 60, at least one battery 62, a GPS chip 64, the radio wave transmitter 47, and various electronics 66. Compartment 54 would have adequate storage room for a cell phone or a pair of eyeglasses.

The inner surface 21 of the top half 8 of the survival kit 2 would have a rubber seal 16 around the entire perimeter of the inner surface 21. This rubber seal 16 would act as an extra measure to prevent water from getting on the inside of the survival kit 2 when the top half 8 and the bottom half 10 are shut.

The inner surface 31 of the bottom half 10 of the survival kit 2 would have a plurality of storage compartments 20 for storing various items such as money, jewelry, driver's license, credit cards, or other personal belongings.

Female latches 70 and 72 would each be attached to the outer surface of bottom half 10 of survival kit 2 by a short length of belt 22. Latches 70 and 72 would allow a belt 90, shown in FIG. 4, to be attached to survival kit 2, with belt 90 being up to three feet long. Belt 90 would allow survival kit 2 to be attached to a user's waist, shoulder, or chest. The belt 90 would have two ends, a first end and a second end, with the first end having a latch 76 and the second end having a latch 78. Latch 76 would be capable of being removably attached to latch 78.

Figure 4:
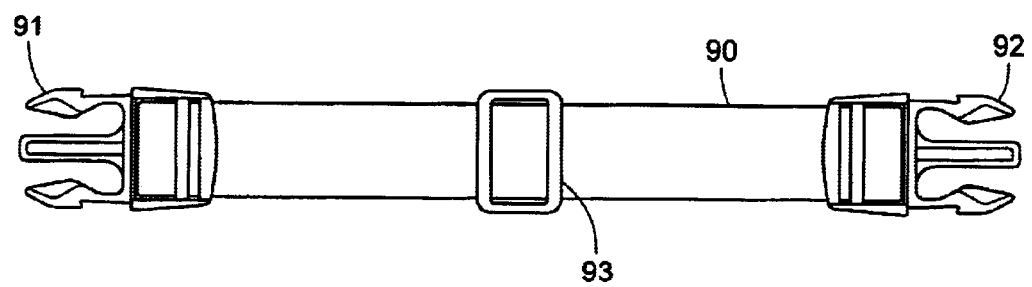
FIG. 4 shows a picture of a belt that is used in conjunction with a pair of latches on a survival kit.
Figure 5:
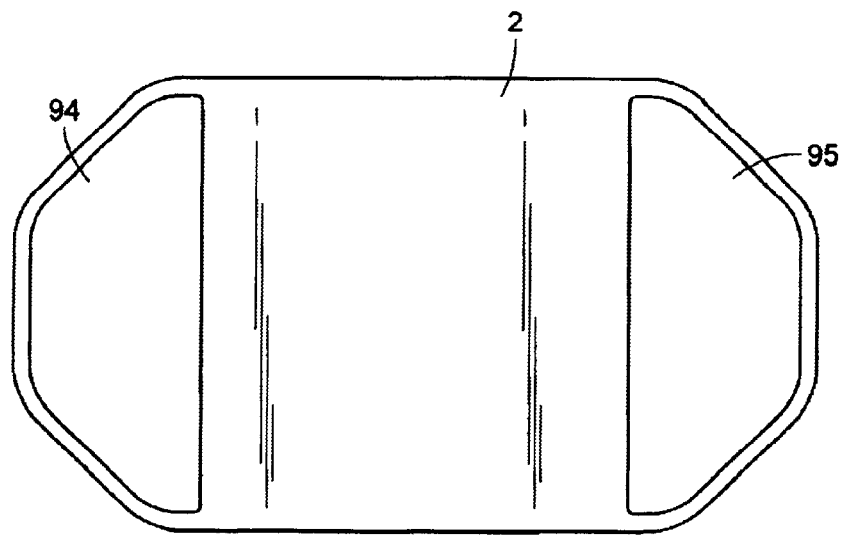
FIG. 5 shows a bottom view of the survival kit.

FIG. 4 shows a picture of belt 90 that is used in conjunction with latches 70 and 72. Belt 90 has two ends, a first and a second end, with male latch 91 attached to the first end of belt 90 and the male latch 92 attached to the second end of belt 90. Adjustment mechanism 93 is located in between the two latches and allows the length of belt 90 to be adjusted. Belt 90 would be placed around an individual's waist, at which time, the male latches 91 and 92 would be attached to latches 70 and 72 to allow the FIG. 5 shows a bottom view of the survival kit 2. Emergency lights 94 and 95 can be seen. The presence of lights both on the top and the bottom of survival kit 2 will allow increase chances that the survival kit 2 will be seen when an actual emergency occurs, because the survival kit 2 could be floating right side up or upside down.

What I claim as my invention is:

1. A survival kit comprising:
   (a) an outer casing having two halves, a top half and a bottom half, each half having two surfaces, an inner surface and an outer surface, each half having two ends, a first end and a second end, the two halves being pivotally attached to one another,
   (b) means for removably sealing the top half to the bottom half of the outer casing,
   (c) a control panel attached to the outer surface of the top half,
   (d) a clock attached to the control panel,
   (e) a plurality of buttons located on the control panel,
   (f) a clock lighting function associated with the survival kit,
   (g) a global positioning system (GPS) function associated with the survival kit,
   (h) a compass function associated with the survival kit,
   (i) an emergency light function associated with the survival kit,
   (j) a pair of storage compartments located on the inner surface of the top half of the survival kit, the pair of storage compartments comprising a first storage compartment and a second storage compartment,
   (k) a rubber seal located around the entire perimeter of the inner surface of the top half of the survival kit,
   (l) a plurality of additional storage compartments located on the inner surface of the bottom half of the survival kit,
   (m) a first pair of latches comprising a first latch and a second latch, the first latch attached to the outer surface of the bottom half of the survival kit near the first end of the bottom half of the survival kit, the second latch attached to the outer surface of the bottom half of the survival kit near the second end of the bottom half of the survival kit,
   (n) power means for providing power to the survival kit, and
   (o) means for mounting the survival kit on an individual so it can be utilized if needed by the individual.

2. A survival kit according to claim 1 wherein the means for removably sealing the top half to the bottom half of the outer casing further comprises a latch.

3. A survival kit according to claim 2 wherein the power means for providing power to the survival kit further comprises:
   (a) a battery compartment located within the first storage compartment within the inner surface of the top half of the survival kit, and
   (b) at least one battery located within the battery compartment.

4. A survival kit according to claim 3 wherein the clock lighting function further comprises:
   (a) a light activation button, the light activation button being one of the plurality of buttons located on the control panel on the top half of the survival kit,
   (b) a light located within the clock,
   (c) wherein depressing the light activation button will cause the light to turn on for a predetermined amount of time.

5. A survival kit according to claim 4 wherein the global positioning system (GPS) function further comprises:
   (a) a radio wave transmitter located within the first storage compartment within the inner surface of the top half of the survival kit,
   (b) a GPS activation button, the GPS activation button being one of the plurality of buttons located on the control panel on the top half of the survival kit,
   (c) wherein depressing the GPS activation button will cause the radio wave transmitter to emit radio waves that can be received by appropriate GPS satellites.

6. A survival kit according to claim 5 wherein the compass function associated with the survival kit further comprises:
   (a) a compass located within the clock on the outer surface of the top half of the survival kit,
   (b) a compass activation button, the compass activation button being one of the plurality of buttons located on the control panel on the top half of the survival kit,
   (c) wherein depressing the compass activation button will cause the compass to become activated and displayed on the clock face, allowing a user to use the compass functions as displayed on the clock face.

7. A survival kit according to claim 6 wherein the emergency light function associated with the survival kit further comprises:
   (a) a first pair of emergency lights comprising a first emergency light and a second emergency light, the first pair of emergency lights being located on the outer surface of the top half of the survival kit,
   (b) a second pair of emergency lights comprising a first emergency light and a second emergency light, the second pair of emergency lights being located on the outer surface of the bottom half of the survival kit,
   (c) an emergency light function activation button, the emergency light function activation button being one of the plurality of buttons located on the control panel on the top half of the survival kit,
   (d) wherein depressing the emergency light function activation button will cause the lights of the first pair of emergency lights and the second pair of emergency lights to become activated and stay on for a predetermined amount of time.

8. A survival kit according to claim 7 wherein the means for mounting the survival kit on an individual so it can be utilized if needed by the individual further comprises:
   (a) a belt having two ends, a first end and a second end,
   (b) a second pair of latches comprising a first latch and a second latch, the first latch attached to the first end of the belt, the second latch attached to the second end of the belt,
   (c) wherein the belt is wrapped around the waist of an individual,
   (d) further wherein the first latch of the first pair of latches attached to the outer surface of the bottom half of the survival kit near the first end of the bottom half of the survival kit is attached to the first latch of the second pair of latches, and
   (e) further wherein the second latch of the first pair of latches attached to the outer surface of the bottom half of the survival kit near the second end of the bottom half of the survival kit is attached to the second latch of the second pair of latches.

* * * * *